J. W. HAWKINS.
STROPPING MACHINE.
APPLICATION FILED APR. 8, 1910. RENEWED MAY 3, 1911.
1,011,429.
Patented Dec. 12, 1911.
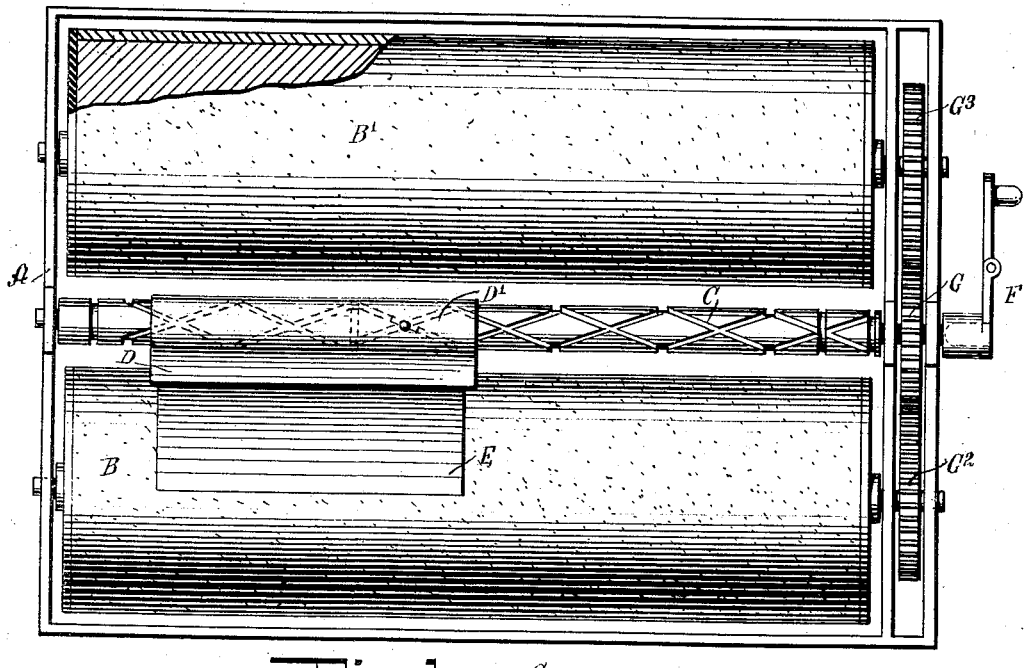
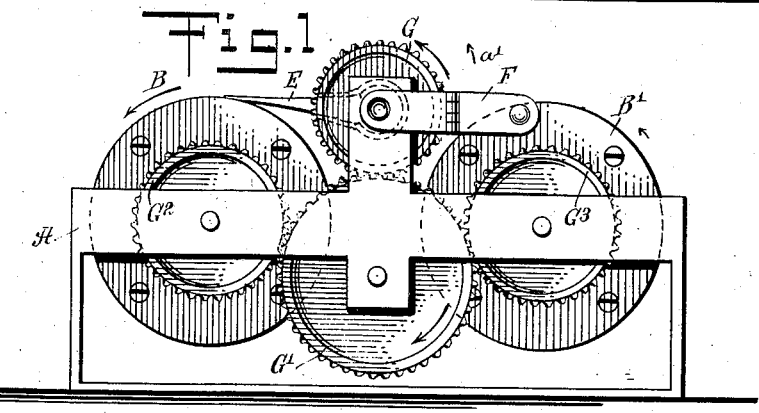
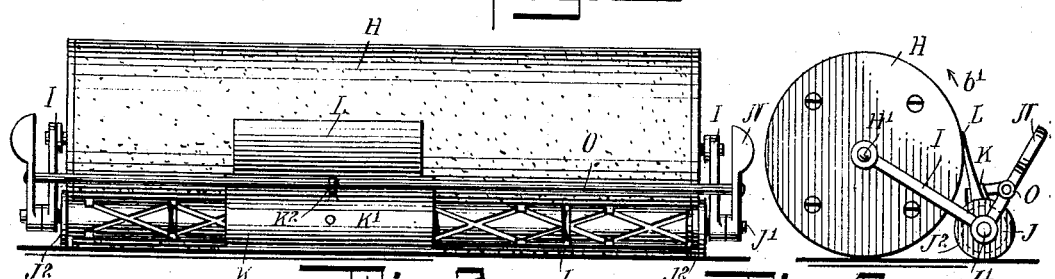
WITNESSES:
INVENTOR
Joseph W. Hawkins
BY
ATTORNEYS

UNITED STATES PATENT OFFICE.

JOSEPH W. HAWKINS, OF PASSAIC, NEW JERSEY.

STROPPING-MACHINE.

1,011,429.          Specification of Letters Patent.          Patented Dec. 12, 1911.

Application filed April 8, 1910, Serial No. 554,093. Renewed May 3, 1911. Serial No. 624,852.

*To all whom it may concern:*

Be it known that I, JOSEPH W. HAWKINS, a citizen of the United States, and a resident of Passaic, in the county of Passaic and State of New Jersey, have invented a new and Improved Stropping-Machine, of which the following is a full, clear, and exact description.

The object of the invention is to provide a new and improved stropping machine, more especially designed for stropping safety razor blades in a very simple and effective manner, the cutting edge of the blade being held in contact with a revoluble stropping roller and moved bodily in the axial direction of the roller, to insure the formation of a keen cutting edge.

For the purpose mentioned, use is made of a stropping roller, a blade holder carrying the blade to hold the edge thereof in contact with the peripheral face of the stropping roller, the blade holder being mounted to travel in the direction of the axis of the stropping roller, to draw the cutting edge across the roller in the direction of the length thereof.

A practical embodiment of the invention is represented in the accompanying drawings forming a part of this specification, in which similar characters of reference indicate corresponding parts in all the views.

Figure 1 is a plan view of the stropping machine; Fig. 2 is a front end view of the same; Fig. 3 is a side elevation of a modified form of the stopping roller; and Fig. 4 is an end view of the same.

In a suitably constructed frame A are journaled the stropping rollers B, B', between which is located a traverse screw C also journaled in the frame A. The traverse screw C is provided with the usual grooves engaged by a shoe D' pivoted on the blade holder D, mounted to travel lengthwise on the traverse screw C and adapted to receive the razor blade E to be stropped by contact with the peripheral surface of the rollers B, B'. On one end of the traverse screw C is secured a crank arm F and a gear wheel G in mesh with an intermediate gear wheel G', journaled on the frame A and in mesh with gear wheels $G^2$, $G^3$ secured to the shafts of the stropping rollers B, B'. Now when the operator turns the crank arm F the traverse screw C and gear wheel G are rotated, whereby a rotary motion is imparted to the stropping rollers B, B' by the gear wheels G', $G^2$ and $G^3$. By the use of the intermediate gear wheel G' the stropping rollers B, B' are caused to rotate in the same direction as the traverse screw C, and the traverse screw when rotated causes the blade holder D to turn with it until the cutting edge of the razor blade E is in contact with the peripheral face of the roller B or B', and further rotation of the traverse screw C causes the holder D to travel lengthwise thereof, thus drawing the cutting edge of the razor blade lengthwise over the peripheral face of the roller B or B'. Thus when the crank arm F is turned in the direction of the arrow $a'$, the blade holder D and with it the razor blade E is flopped over to the left, to engage one side of the cutting edge of the razor blade E with the peripheral face of the stropping roller B, and then, on further turning of the crank arm F, the holder D and with it the razor blade E is moved lengthwise of the traverse screw C and roller B, thus drawing the cutting edge of the razor blade lengthwise over the peripheral face of the roller B and alternately forward and backward. When the operator turns the crank arm F in the inverse direction of the arrow $a'$, the blade holder D and razor blade E are flopped over to the right, to engage the other side of the cutting edge with the peripheral face of the rotating roller B', and to subsequently draw the said cutting edge lengthwise along the said peripheral face of the roller B', owing to the transverse forward and backward motion given to the blade holder D by the traverse screw C. It is understood that the blade holder D and its blade E, in contact with either roller B or B', travels forward and backward as long as the crank arm F is turned in one direction, and when the crank arm F is turned in the opposite direction, the blade holder D and its blade E are flopped over to engage the cutting edge of the razor blade E with the other roller B or B', after which the transverse movement of the blade holder D and the razor blade E begins from one side to the other, as above explained. Thus both sides of the cutting edge of the razor blade E can be properly stropped. The blade holder is open at both ends for convenient insertion or removal of the razor blade, and is also provided with side arms for clampingly engaging the faces of the razor blade E, to securely hold the same in position in the blade holder D during the stropping operation.

In the modified form shown in Figs. 3 and 4, a single stropping roller H is used, and on its shaft H' are hung arms I, in which is journaled the shaft J' of the traverse screw J, having its grooves engaged by a shoe K' pivoted in the blade holder K, for receiving the razor blade L to be stropped on the peripheral face of the stropping roller H. Handles N are hung on the ends of the shaft J' and are connected with each other by a rod O engaging a bearing $K^2$ on the holder K, so that the latter is guided in its transverse movement on the traverse screw J.

On the ends of the traverse screw J are formed or secured wheels or rollers $J^2$, somewhat larger in diameter than the diameter of the traverse screw J, and the said wheels $J^2$ and the stropping roller H are adapted to travel on a table or other surface, to rotate the stropping roller H and the traverse screw J.

In using this machine, the operator inserts the razor blade L into the holder K and then takes hold of the handles N and pushes the machine forward over the table or other surface, thus rotating the stropping roller H and the traverse screw J in the direction of the arrow $b'$, whereby the blade holder K and its razor blade L are swung forward to engage one side of the cutting edge of the razor blade L with the peripheral surface of the stropping roller H, and to move the blade holder K and the razor blade L lengthwise of the stropping roller H, with the cutting edge in contact therewith. On the return movement of the machine, the pull exerted by the operator on the handles N causes the blade holder K and the razor blade to swing rearward (to the right) to disengage the cutting edge of the razor blade L from the peripheral face of the stropping roller H. The operator pushes the machine alternately forward and backward, as described, and as many times as desired, that is, until one side of the cutting edge is stropped. The razor blade L is now drawn out of the blade holder K and reversed and re-inserted, and the above-described operation is repeated to strop the other side of the cutting edge of the razor blade.

It is understood that in each case described, the blade holder is drawn across the stropping surface, traveling in a different direction, and although I prefer the use of the stropping rollers, it is evident that other traveling stropping surfaces, such as a moving belt or band, may be used.

Having thus described my invention, I claim as new and desire to secure by Letters Patent:

1. A stropping machine, comprising a traveling stropping surface, a blade holder for the razor blade, and revoluble means on which the blade holder is mounted for turning the blade holder to move the razor blade into contact with the traveling surface and for imparting motion to the said blade holder to draw the cutting edge of the razor blade across the said traveling surface, and means for actuating the said revoluble means.

2. A stropping machine, comprising a revoluble stropping roller, a blade holder for the razor blade, a traverse screw mounted to turn in unison with the stropping roller and on which the blade holder is mounted to hold the cutting edge of the razor blade in contact with the peripheral face of the stropping roller and to draw the cutting edge lengthwise along the peripheral face of the stropping roller, the said blade holder having a shoe engaging the grooves of the traverse screw, and means for actuating the traverse screw.

3. A stropping machine, comprising a revoluble stropping roller, a blade holder having clamping arms for engaging the faces of the blade, a revoluble device carrying said blade holder for turning the same to move the cutting edge of the blade into contact with the stropping roller and for imparting a lengthwise traveling motion to the blade holder to draw the cutting edge of the blade lengthwise across the peripheral face of the revoluble stropping roller and means adapted when turned to rotate the said revoluble device, the said stropping roller and said revoluble device being mounted to turn in unison and in the same direction.

4. A stropping machine, comprising a frame, a pair of stropping rollers journaled in the frame, a traverse screw journaled in the frame, means for turning the traverse screw in either direction, a gearing connecting the rollers and traverse screw with each other, and a blade holder for the razor blade mounted to travel on the traverse screw, the blade carried by the said blade holder being adapted to engage either of said stropping rollers according to the direction in which the gearing is turned.

5. A stropping machine, comprising a frame, a pair of stropping rollers journaled in the said frame, a traverse screw journaled in the said frame between the stropping rollers, a gearing connecting the said rollers and traverse screw with each other to rotate the same in unison, means for setting the said gearing in motion in either direction, and a blade holder mounted on the said traverse screw, the blade carried by said holder being adapted to engage with its cutting edge either of the said rollers according to the direction in which the gearing is turned, said blade holder having a shoe engaging the grooves in the traverse screw.

6. A stropping machine, comprising a movable stropping surface, a blade holder for the razor blade, a traverse screw mounted to turn and on which the blade holder is mounted, the said traverse screw being adapted to hold the cutting edge of the razor blade in contact with the stropping surface and draw the cutting edge of the razor blade across the stropping surface, and means connected with the traverse screw for rotating the same.

In testimony whereof I have signed my name to this specification in the presence of two subscribing witnesses.

JOSEPH W. HAWKINS.

Witnesses:
    THEO. G. HOSTER,
    PHILIP D. ROLLHAUS.